(12) United States Patent
Son et al.

(10) Patent No.: US 7,424,015 B2
(45) Date of Patent: Sep. 9, 2008

(54) METHOD OF MANAGING FORWARDING TABLES OF NETWORK PROCESSORS BASED ON ADDRESS LEARNING IN LINE CARD

(75) Inventors: Myung Hee Son, Daejeon (KR); Jong Hyup Lee, Daejeon (KR); Young Sun Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 934 days.

(21) Appl. No.: 10/463,036

(22) Filed: Jun. 16, 2003

(65) Prior Publication Data

US 2004/0120327 A1    Jun. 24, 2004

(30) Foreign Application Priority Data

Dec. 20, 2002    (KR) .................. 10-2002-0081506

(51) Int. Cl.
*H04L 12/28* (2006.01)
*H04L 12/56* (2006.01)

(52) U.S. Cl. .................. 370/389; 370/392; 370/400; 370/401

(58) Field of Classification Search .............. 370/395.3, 370/400, 401, 402, 389, 392, 395.31, 395.4, 370/395.41, 395.7, 404, 405; 709/238, 242
See application file for complete search history.

(56) References Cited

U.S. PATENT DOCUMENTS

| 6,101,188 | A | * | 8/2000 | Sekine et al. ............... 370/401 |
| 6,236,654 | B1 | | 5/2001 | Egbert ........................ 370/392 |
| 6,778,542 | B1 | * | 8/2004 | Hassan-Ali et al. .......... 370/401 |
| 6,993,033 | B1 | * | 1/2006 | Williams ..................... 370/400 |
| 7,190,696 | B1 | * | 3/2007 | Manur et al. ................. 370/392 |
| 2002/0186694 | A1 | * | 12/2002 | Mahajan et al. ............. 370/390 |
| 2003/0058859 | A1 | * | 3/2003 | Wu et al. ..................... 370/392 |
| 2003/0223425 | A1 | * | 12/2003 | Shenoy et al. ............... 370/394 |

* cited by examiner

*Primary Examiner*—Firmin Backer
*Assistant Examiner*—Farah Faroul
(74) *Attorney, Agent, or Firm*—Blakely, Sokoloff, Taylor & Zafman (57) ABSTRACT

The present invention provides a method of managing forwarding tables of network processors based on address learning in a line card. In this method, a demultiplexing module transmits N Ethernet data frames having the same source address to ports of network processors in sequence. Each of the network processors adds an entry to its address learning table and transmits the received Ethernet data frame to the main processor. The main processor determines whether an entry corresponding to the Ethernet data frame exists in its forwarding table. If the entry exists and the learning process count (LRNG_CNT) flag value is greater than zero, the main processor increases the LRNG_CNT flag value by one. If the entry does not exist, the main processor adds the entry to its forwarding table, increases the LRNG_CNT flag value, and requests creation of the entry in forwarding tables from the network processors.

6 Claims, 5 Drawing Sheets

METHOD OF MANAGING FORWARDING TABLES OF NETWORK PROCESSORS BASED ON ADDRESS LEARNING IN LINE CARD

BACKGROUND OF THE INVENTION

1. Field of the Invention

The present invention relates generally to a method of managing forwarding tables of network processors, and more particularly to a method of managing forwarding tables of network processors based on address learning in a line card of an Ethernet system having a plurality of network processors and a multiplexing/demultiplexing module, and a computer readable storage medium for storing a program for executing the method, which reduces the number of times network processors must access forward tables to one by adjusting a plurality of address learning results, thus reducing the number of instances of entry update and entry deletion in forwarding tables to one.

2. Description of the Prior Art

In general, a forwarding table of an Ethernet system that provides a bridge function is generated by a process of learning addresses. The address learning process adds a source address of an Ethernet data frame and the information of a port, through which the Ethernet data frame is received, to a forwarding table as a meaningful entry for aging time. If the same data frame is not received for the aging time, the entry is deleted from the forwarding table.

A line card of the Ethernet system exploits network processors to provide a high-speed forwarding function. An address learning process is performed in each of the network processors, and various information managed in the network processors is integrated by a main processor and transmitted to the network processors from the main processor.

However, a system, which is capable of providing a large band interface by connecting a plurality of network processors providing small bands and a multiplexing/demultiplexing module, is problematic in that overhead required to manage forwarding tables results from multiple address learning processes in a line card when a forwarding entry is generated. In particular, due to the overhead of excessive address learning processes, the entries of the forwarding table are frequently updated and deleted, so it is difficult to effectively manage the forwarding table.

U.S. Pat. No. 6,236,654 B1 discloses a method and apparatus for effectively managing an address table to generate frame forwarding information in a switch where address learning processes are performed through multiple ports. That is, this patent utilizes an address table to generate frame forwarding information in a network switch configured to switch data packets across multiple ports. If a forwarding entry decision engine does not find a match, the network switch adds an entry to the address table using a source address of a received data frame and a port number on which the data frame is received. The new entry is used to generate frame forwarding information in subsequent searches of the address table. However, this patent provides a normal address learning method in a line card using a single chip, and cannot solve the above-described problems. That is, this patent does not provide a method of performing a multiple number of instances of entry update and entry deletion in a plurality of network processors at one time in the same manner as in a line card using a single chip.

SUMMARY OF THE INVENTION

The present invention provides a method of managing forwarding tables of network processors based on address learning in a line card of an Ethernet system having a plurality of network processors and a multiplexing/demultiplexing module, and a computer readable storage medium for storing a program for executing the method, which reduces the number of instances of entry update or entry deletion in forwarding tables to one by adjusting a plurality of address learning results.

In order to accomplish the above object, the present invention provides a method of managing forwarding tables of network processors based on address learning in a line card communicating with a main processor and having a plurality of network processors and a multiplexing/demultiplexing module, including the first step of the demultiplexing module transmitting N Ethernet data frames having the same source address to ports of the network processors in sequence when the line card receives the N Ethernet data frames; the second step of each of the network processors, which has received the Ethernet data frame, adding an entry to its address learning table after searching the address learning table, initializing an aging timer, and transmitting the received Ethernet data frame to the main processor; the third step of the main processor, which has received the Ethernet data frame, determining whether an entry corresponding to the Ethernet data frame exists in its forwarding table; and the fourth step of, if the entry corresponding to the Ethernet data frame exists, the main processor checking a number-of-address learning processes count (hereinafter referred to as "LRNG_CNT") flag value, if the entry corresponding to the Ethernet data frame exists and the LRNG_CNT flag value is greater than zero, the main processor increasing the LRNG_CNT flag value by one, and if the entry corresponding to the Ethernet data frame does not exist, the main processor adding the entry corresponding to the Ethernet data frame to its forwarding table, increasing the LRNG_CNT flag value by one, and requesting creation of the entry in forwarding tables from the network processors via the line card.

In the method, the LRNG_CNT flag value is greater than zero in the case where the same address is learned from other multiple network processors.

In addition, the present invention provides a computer readable storage medium for storing a program for performing the steps of the method.

In addition, the present invention provides a method of managing forwarding tables of network processors based on address learning in a line card that communicates with a main processor and is equipped with a plurality of network processors and a multiplexing/demultiplexing module, including the first step of, when the main processor is requested to delete the previously learned address data, the main processor examining whether an entry corresponding to previously learned address data exists in its forwarding table using a source address of the previously learned address data; the second step of, if the entry corresponding to previously learned address data exists, the main processor checking the LRNG_CNT flag value; the third step of, if the LRNG_CNT flag value is not zero, the main processor reducing the LRNG_CNT flag value by one; and the fourth step of the main processor checking the reduced LRNG_CNT flag value, and if the reduced LRNG_CNT flag value is zero, the main processor deleting the entry corresponding to previously learned address data from its forwarding table of the main processor and requesting deletion of the entry corresponding to previously learned address data in forwarding tables from all network processors via the line card.

In addition, the present invention provides a computer readable storage medium for storing a program for performing the steps of the latter method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1:
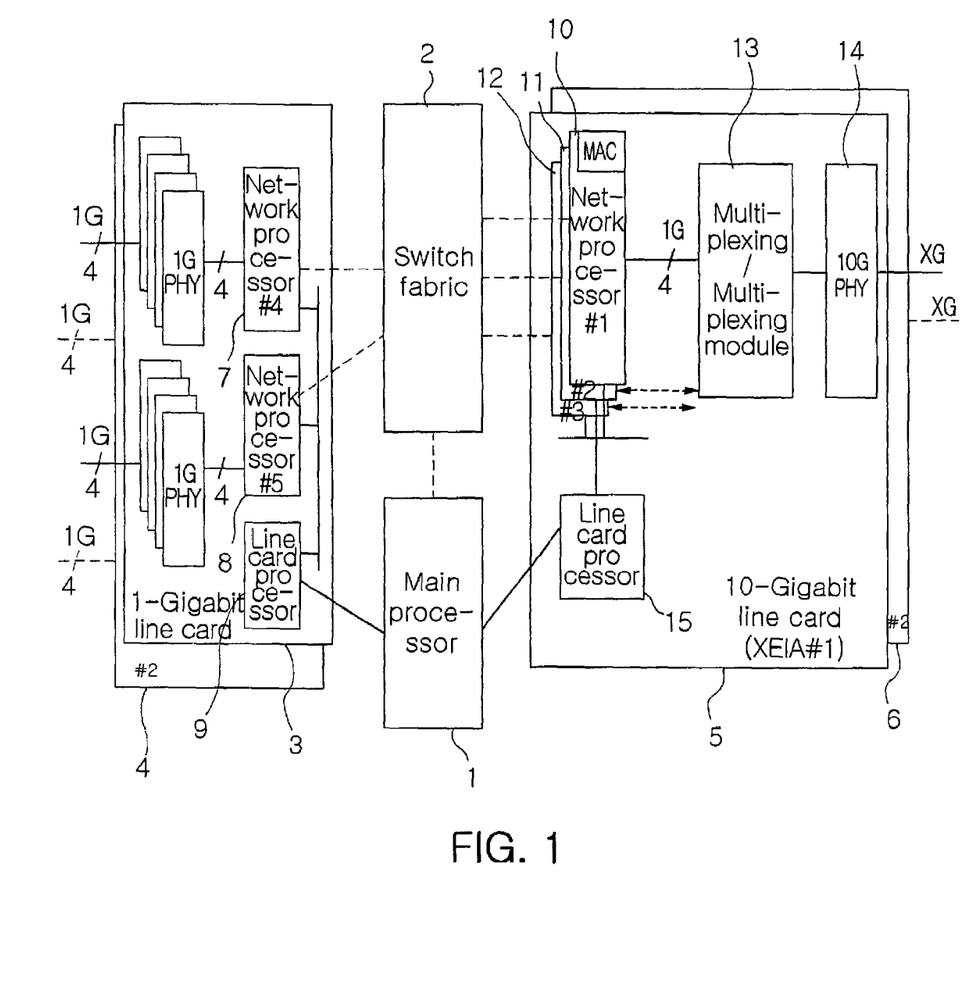
FIG. 1 is a view showing the construction of an Ethernet system to which the present invention is applied.

FIG. 1 is a view showing the construction of an Ethernet system to which the present invention is applied. The present invention can be applied to a general system that is constructed by generalizing the construction of the system of FIG. 1 to be applied to an interface having any band. Accordingly, the present invention provides a method of reducing the number of times network processors must access forwarding tables to one by adjusting a plurality of address learning results using an LRNG_CNT flag.

Referring to FIG. 1, the Ethernet system to which the present invention is applied includes a switch fabric 2, a plurality of line cards 3, 4, 5 and 6, and a main processor 1 that arbitrates between the switch fabric 2 and the plurality of line cards 3, 4, 5 and 6. An actual address learning process is performed in each of network processors 7, 8, 10, 11 and 12 of the line cards 3, 4, 5 and 6, so received information is transmitted to the main processor 1. All information is integrated in the main processor 1, and transmitted to forwarding tables of all network processors.

As shown in FIG. 1, 10-Gigabit line cards 5 and 6 each include three 1-Gigabit network processors 10, 11 and 12 and a multiplexing/demultiplexing module 13, and are constructed to provide a 10-Gigabit band. A structure in which a band is generalized is illustrated in FIG. 2.

Figure 2:
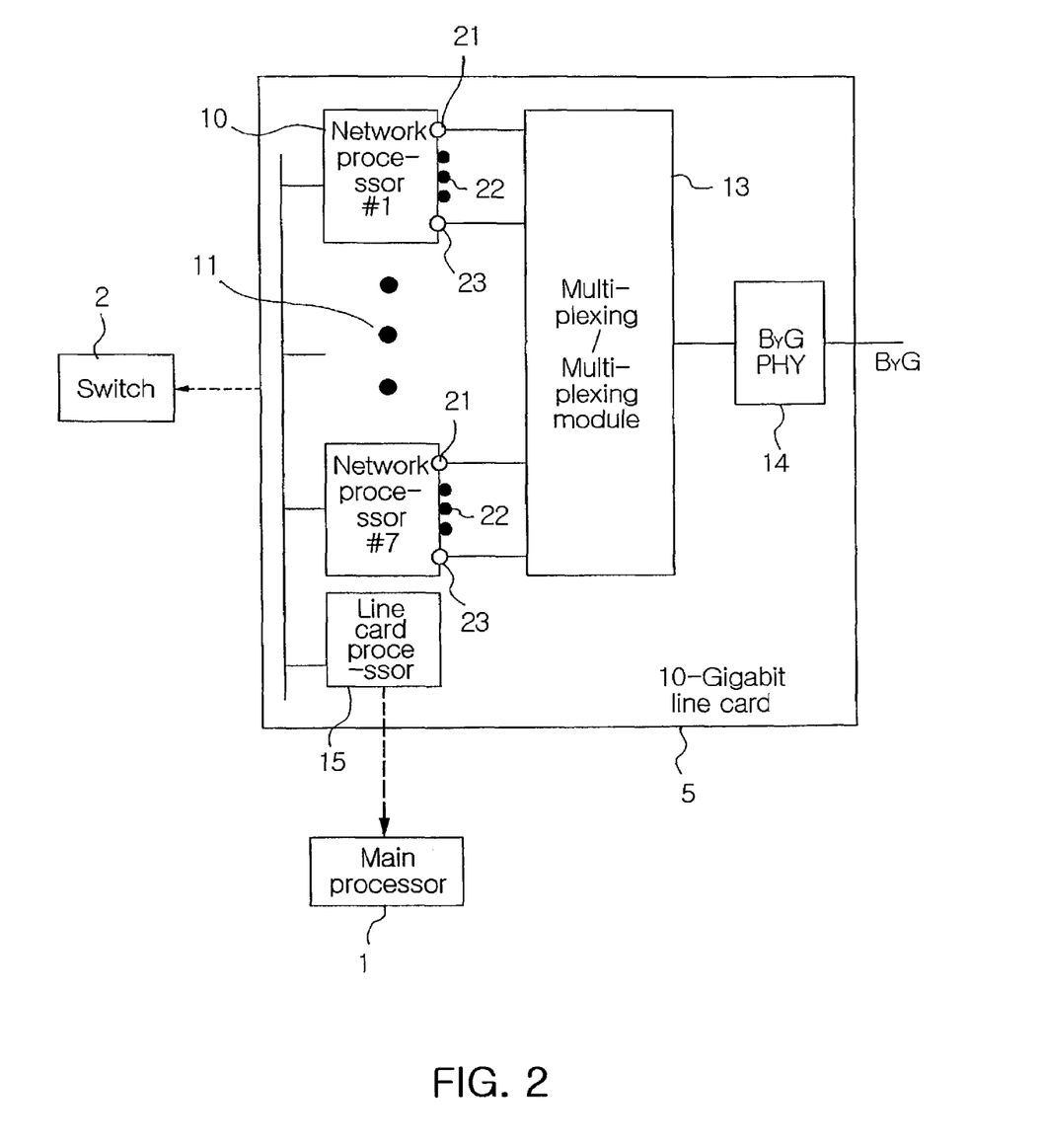
FIG. 2 is a view showing the construction of a line card to which the present invention is applied.

FIG. 2 is a view showing the construction of a line card to which the present invention is applied, that is, the construction of a line card that provides a band By. As depicted in FIG. 2, the line card to which the present invention is applied includes n network processors 10, 11 and 12, a multiplexing/demultiplexing module 13, an interface 14 that provides an actual line card band, and a line card processor 15 that communicates with the main processor 1. In this construction, a band By of an actual port of the line card 5 is described as below.

$$B_Y = \sum_{j=1}^{n} \sum_{i=1}^{l_j} b_{ij}$$

where j indicates a j-th one of n network processors, $I_j$ indicates the number of total ports that a j-th network processor has, i indicates i-th one of the total ports, and $b_{ji}$ indicates a band value that an i-th port of the j-th network processor has.

If it is assumed that $$\sum_{j=1}^{n} I_j$$

Figure 3:
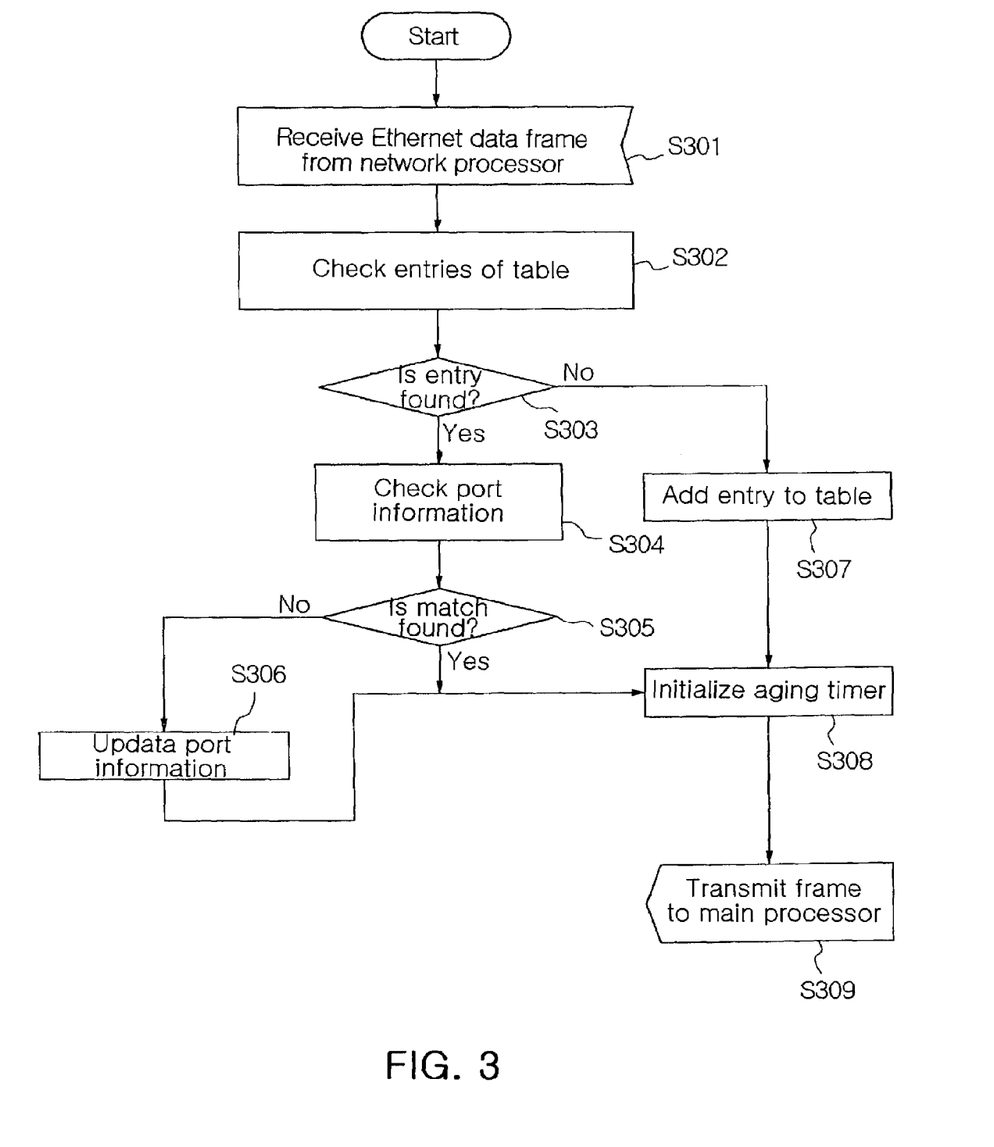
FIG. 3 is a flowchart showing a process of learning an address in each of network processors in accordance with the present invention.

Ethernet data frames having the same source address are received through the actual interface 14 of the line card in the worst case, the multiplexing/demultiplexing module 13 is operated in a round robin manner and transmits received Ethernet data frames to ports 21, 22 and 23 of the network processors 10, 11 and 12 in sequence. A process of learning an address in each of the network processors 10, 11 and 12 is described with reference to FIG. 3. Entry update or entry deletion is performed $$\sum_{j=1}^{n} I_j$$

times in two-layer forwarding tables of the main processor and the network processors 10, 11 and 12.

The present invention may maximally reduce the number of instances of entry update or entry deletion in forwarding tables by $$\sum_{j=1}^{n} I_j - 1$$

using an LRNG_CNT flag value.

Hereinafter, a method of reducing the number of instances of entry update or entry deletion in forwarding tables is described with reference to the accompanying drawings.

FIG. 3 is a flowchart showing a process of learning an address in each of network processors in accordance with the present invention. In the present invention, when Ethernet data frames of a number corresponding to the number of ports of network processors in the line card, which have the same source address, are received by a line card, a demultiplexing module transmits the Ethernet data frames to first to last ports of the network processors in sequence.

Referring to FIG. 3, a process of learning an address in each of the network processors is described below. When each of the network processors 10, 11 and 12 receives an Ethernet data frame at step S301, the network processor 10, 11 or 12 searches its address learning table using a source address of the received Ethernet data frame as a key at step S302, and determines whether an entry corresponding to the received Ethernet data frame exists in its address learning table at step S303. If as the result of the determination of step 303, the entry corresponding to the received Ethernet data frame exists in the address learning table, the network processor 10, 11 or 12 searches port information of the network processor 10, 11 or 12 at step S304 and determines whether a match of port information exists at step S305. If as the result of the determination of step S305, the match of port information exists, the network processor 10, 11 or 12 initializes an aging timer at step S308, and transmits the received Ethernet data frame to the main processor 1 at step S309.

If as the result of the determination of step S305, the match of port information does not exist, the network processor 10, 11 or 12 updates existing port information at step S306, initializes the aging timer at step S308, and transmits the received Ethernet data frame to the main processor 1 at step S309.

If as the result of the determination of step S303, the entry corresponding to the received Ethernet data frame does not exist in the address learning table, the network processor 10, 11 or 12 adds the entry corresponding to the received Ethernet data frame to the address learning table at step S307, initializes the aging timer at step S308, and transmits the received Ethernet data frame to the main processor 1 at step S309.

Figure 4:
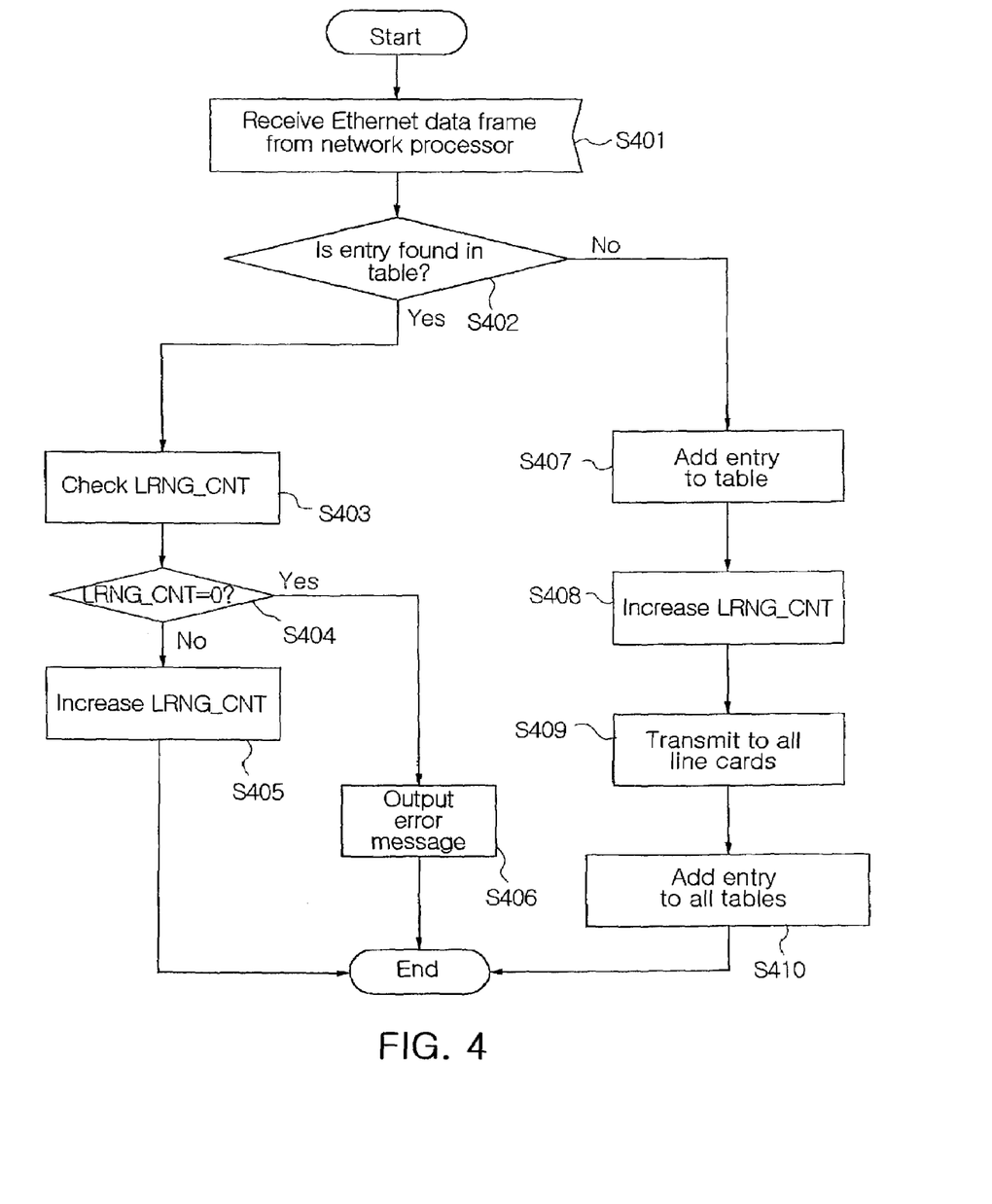
FIG. 4 is a flowchart showing a process of handling an address addition request in a main processor in accordance with the present invention.

FIG. 4 is a flowchart showing a process of handling an address addition request in the main processor in accordance with the present invention. This process is described in detail with reference to FIG. 4 below. When the main processor 1 receives an Ethernet date frame from the network processor 10, 11 or 12 at step S401, the main processor 1 searches its forwarding table using a source address of the received Ethernet data frame as a key and determines whether an entry corresponding to the received Ethernet data frame exists in this forwarding table at step S402. If as the result of the determination of step S402, the entry corresponding to the received Ethernet data frame exists in the forwarding table, the main processor 1 checks an LRNG_CNT flag value at step S403, and determines whether the LRNG_CNT flag value is zero at step S404. In the case where the same address is learned from the plurality of network processors 10, 11 and 12, the LRNG_CNT flag value has a value greater than zero.

If as the result of the determination of step S404, the LRNG_CNT flag value is zero, this LRNG_CNT flag value means that data was found though the data should not exist. In this case, the main processor 1 outputs an error message at step S406, and ends the process. If the LRNG_CNT flag value has a value greater than zero, this LRNG_CNT flag value means that the same address has already been learned and received from the other network processors. In this case, the main processor 1 increases the LRNG_CNT flag value by one at step S405, and ends the process.

If as the result of the determination of step S402, the entry corresponding to the received Ethernet data frame does not exist in the forwarding table, the source address is a first received address, so the main processor 1 adds the entry corresponding to the received Ethernet data frame to the forwarding table at step S407, increases the LRNG_CNT flag value by one at step S408, and requests the creation of the entry in a forwarding table from all the network processors 7, 8, 10, 11 and 12 via all line card processors 9 and 15 at steps S409 and S410.

With this process, the overhead of performing update of information existing in the forwarding tables of the network processors 16, 17 and 18 multiple times can be reduced.

Figure 5:
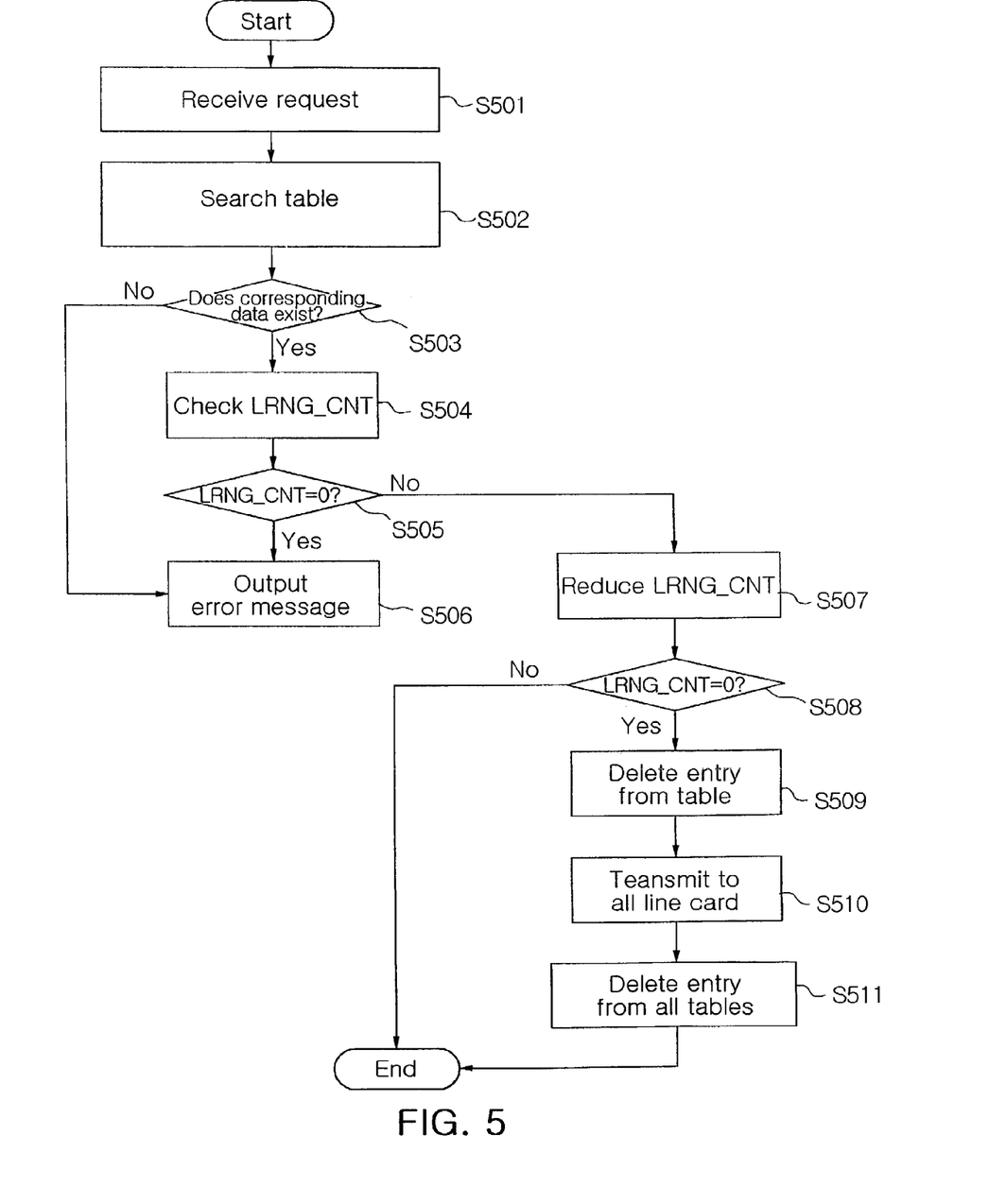
FIG. 5 is a flowchart showing a process of handling an address deletion request in the main processor in accordance with the present invention.

FIG. 5 is a flowchart showing a process of handling an address deletion request in the main processor in accordance with the present invention. This process is described in detail with reference to FIG. 5 below. If the main processor 1 receives a request for the deletion of previously learned address data in the case where aging-out occurs in one of the network processors 10, 11 and 12 at step S501, the main processor 1 searches its forwarding table using the previously learned address information as a key at step S502, and determines whether an entry corresponding to the previously learned address information exists at step S503. If as the result of the determination of step S503, the corresponding entry does not exist, the main processor 1 outputs an error message at step S505, and ends the process. If the corresponding entry exists, the main processor 1 checks a LRNG_CNT flag value at step S504, and determines whether the LRNG_CNT flag value is zero at step S505. If as the result of the determination of step S505, the LRNG_CNT flag value is zero, the main processor 1 outputs an error message at step S506, and ends the process. If the LRNG_CNT flag value is not zero, the main processor 1 reduces the LRNG_CNT flag value by one at step S507, and determines whether the reduced LRNG_CNT flag is zero at step S508.

If as the result of the determination of step S508, the reduced LRNG_CNT flag is zero, this reduced LRNG_CNT flag means that the corresponding entry having the reduced LRNG_CNT flag is the last entry in the case of redundant address learning, so the main processor 1 deletes the corresponding entry from its forwarding table at step S509. Subsequently, the main processor 1 causes all network processors 10, 11 and 12 to delete the corresponding entry from their forwarding tables via the line card processors 15 at step S511.

If as the result of the determination of step S508, the reduced LRNG_CNT flag is not zero, this reduced LRNG_CNT flag means that the corresponding entry having this reduced LRNG_CNT flag is still useful in forwarding tables of the network processors 10, 11 and 12, so the main processor 1 ends the process without issuing any command to the network processors 10, 11 and 12.

As described above, in a line card that uses a plurality of network processors each having a small capacity and integrates interfaces each having a small band and being provided by the network processors to be operated like an interface having a single large band, when address learning processes of a number corresponding to the number of interfaces provided by a plurality of network processors should be performed, the present invention provides a method that is capable of reducing the number of instances of entry update or entry deletion corresponding to the number of the interfaces of the network processors to one in the main processor and the network processors.

Accordingly, when $$\sum_{j=1}^{n} I_j$$

Ethernet data frames having the same source address are received in a line card including n network processors each with a plurality of ports and a multiplexing/demultiplexing module, the main processor can maximally reduce the number of instances of entry update or entry deletion in all forwarding tables by $$\sum_{j=1}^{n} I_j - 1$$

using the LRNG_CNT flag value.

In the meantime, the forwarding table managing method of the present invention constructed as described above can be implemented as a computer program, and can be stored in a storage medium, such as a Compact Disc Read Only Memory (CD ROM), a Random Access Memory (RAM), a ROM, a floppy disc, a hard disc and a magneto-optical disc, in a computer-readable form.

As described above, the present invention provides a forwarding table managing method, which reduces the number of instances of entry update or entry deletion resulting from multiple address learning processes to one in a system that provides an interface having a large band by connecting a plurality of network processors each having a small band with a multiplexing/demultiplexing module, thus performing multiple address learning processes, as done in a single network processor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of managing forwarding tables of network processors based on address learning in a single line card communicating with a main processor and having a plurality of network processors and a multiplexing/demultiplexing module, comprising:

the first step of the demultiplexing module of the main processor transmitting N Ethernet data frames having the same source address to ports of the network processors in sequence when the single line card receives the N Ethernet data frames;

the second step of each of the network processors, which has received an Ethernet data frame, adding an entry to its address learning table after searching the address learning table, initializing an aging timer, and transmitting the received Ethernet data frame to the main processor;

the third step of the main processor, which has received the Ethernet data frame, determining whether an entry corresponding to the Ethernet data frame exists in its forwarding table; and the fourth step of, if the entry corresponding to the Ethernet data frame exists, the main processor checking a learning process count (LRNG_CNT) flag value, if the entry corresponding to the Ethernet data frame exists and the LRNG_CNT flag value is greater than zero, the main processor increasing the LRNG_CNT flag value by one, and if the entry corresponding to the Ethernet data frame does not exist, the main processor adding the entry corresponding to the Ethernet data frame to its forwarding table, increasing the LRNG_CNT flag value by one, and requesting creation of the entry based solely on a source address of the Ethernet data frame in each of the forwarding tables of the network processors via the single line card.

2. The method according to claim 1, wherein the second step comprises the steps of:

the network processor examining whether the entry corresponding to the received Ethernet data frame exists in the address learning table using the source address of the received Ethernet data frame; and if the entry corresponding to the received Ethernet data frame exists in the address learning table and the match of port information exists, the network processor determining whether a match of port information exists and initializing the aging timer, and if the entry corresponding to the received Ethernet data frame exists in the address learning table and the match of port information does not exist, the network processor updating the port information and then initializing the aging timer.

3. The method according to claim 1, wherein the LRNG_CNT flag value is greater than zero in the case where the same address has been learned from the other multiple network processors.

4. A method of managing forwarding tables of network processors based on address learning in a single line card that communicates with a main processor and is equipped with a plurality of network processors and a multiplexing/demultiplexing module, comprising:

the first step of, when the main processor is requested to delete a previously learned address data, the main processor examining whether an entry corresponding to the previously learned address data exists in its forwarding table solely using a source address of the previously learned address data;

the second step of, if the entry corresponding to the previously learned address data exists, the main processor checking a learning process count (LRNG_CNT) flag value;

the third step of, if the LRNG_CNT flag value is not zero, the main processor reducing the LRNG_CNT flag value by one; and the fourth step of the main processor checking the reduced LRNG_CNT flag value, and if the reduced LRNG_CNT flag value is zero, the main processor deleting the entry corresponding to the previously learned address data from its forwarding table of the main processor and requesting deletion of the entry solely corresponding to the source address of the previously learned address data in each of the forwarding tables from all network processors via the single line card.

5. The method according to claim 4, wherein the entry corresponding to the previously learned address data is a last one of multiple times learned entries of the forwarding table of the main processor in the case where the reduced LRNG_CNT flag value is zero.

6. A computer-readable recording medium which stores a program therein in a single line card communicating with a main processor and having a plurality of network processors and a multiplexing/demultiplexing module, the program executing the steps of:

the first step of the demultiplexing module transmitting N Ethernet data frames having a same source address to ports of the network processors in sequence when the single line card receives the N Ethernet data frames;

the second step of each of the network processors, which has received an Ethernet data frame, adding an entry to its address learning table after searching the address learning table, initializing an aging timer, and transmitting the received Ethernet data frame to the main processor;

the third step of the main processor, which has received the Ethernet data frame, determining whether an entry corresponding to the Ethernet data frame exists in its forwarding table; and the fourth step of, if the entry corresponding to the Ethernet data frame exists, the main processor checking a learning process count (LRNG_CNT) flag value, if the entry corresponding to the Ethernet data frame exists and the LRNG_CNT flag value is greater than zero, the main processor increasing the LRNG_CNT flag value by one, and if the entry corresponding to the Ethernet data frame does not exist, the main processor adding the entry corresponding to the Ethernet data frame to its forwarding table, increasing the LRNG_CNT flag value by one, and requesting creation of the entry based solely on the same source address of the Ethernet data frame in each of the forwarding tables from the network processors via the single line card.

* * * * *